Feb. 5, 1974  J. NOVAK  3,790,449
METHOD OF AND APPARATUS FOR CONTINUOUS ELECTROCHEMICAL
METERING OF SUBSTANCE CONCENTRATIONS IN GASEOUS
MEDIA, WITH ELECTROLYTE RECIRCULATION
Filed June 12, 1972

3,790,449
METHOD OF AND APPARATUS FOR CONTINUOUS ELECTROCHEMICAL METERING OF SUBSTANCE CONCENTRATIONS IN GASEOUS MEDIA, WITH ELECTROLYTE RECIRCULATION
Jiri Novak, Prague, Czechoslovakia, assignor to Ceskoslovenska Akademie ved, Prague, Czechoslovakia
Filed June 12, 1972, Ser. No. 262,053
Claims priority, application Czechoslovakia, June 10, 1971, 4,251/71
Int. Cl. G01n 27/46
U.S. Cl. 204—1 T                     5 Claims

ABSTRACT OF THE DISCLOSURE

Method of and apparatus for continuous electrochemical metering of concentrations of or analyzing noxious substances, such as sulphur dioxide, hydrogen sulphide, halogens, or ozone, in gaseous media. An electrolyte solution is drawn from a storage tank and forced successively through a metering system of electrode cells with at least one indicating electrode and a reference electrode cell, the reference electrode cell forming the last downstream stage of said system, whereby harmful products arising in electrode reactions are made ineffective by electrochemical reactions, the degree of concentration of said products being proportional to the sum of the currents flowing through said metering system. A major portion of said electrolyte solution is reintroduced into the storage tank to be repeatedly recirculated; a minor portion of said electrolyte solution is passed through said reference electrode cell. The said electrolyte solution is an aqueous solution of sulphuric acid which is saturated with elemental iodine during its passage between the storage tank and the metering system.

BACKGROUND OF THE INVENTION

The present invention relates to a method of continuous electrochemical metering or analysis of substance concentrations in gaseous media, with electrolyte recirculation.

With polarographic, coulometric and other electrochemical analyzers, wherein the degree of concentration of the substance to be analyzed is determined by electrolytic current flowing through the electrolyte between an indicator electrode and a reference one, the presence of electrode reaction products arising at the reference electrode and penetrating by diffusion or in any other way to the indicator electrode produces difficulties.

An example of such an apparatus is a continuously operating coulometric analyzer of sulphur dioxide, in which a metering, i.e. electrolytic cell receiving an indicating electrode (anode) and a reference electrode (cathode) has an acidic solution with an elementary iodine content flowing therethrough. Adjacent the indicating electrode there is introduced into the solution, at a constant rate, a gaseous medium containing sulphur dioxide. As known, sulphur dioxide reacts with iodine, giving rise to an equivalent amount of iodide ions which latter are then subjected at the indicator electrode to a complete anodic oxidation back to the elemental iodine; an equivalent of elemental iodine is simultaneously electrochemically reduced to iodide ions at the reference electrode.

A portion of said iodide ions passes from the reference electrode to the indicator electrode where their presence provokes an undesirable increase of a so-called residual current, by which the precision and the reliability of measurement are substantially impaired.

A detrimental effect of the reaction products, i.e. iodide ions, arising on the reference electrode can be substantially suppressed by allowing the electrolyte to flow, for the entire metering period, in the direction from the indicator electrode towards the reference electrode so that iodide ions are prevented from coming into contact with the indicator electrode. The last mentioned method, however, still possesses the disadvantage of a relatively high consumption of the solution used as electrolyte and, consequently, in the necessity of frequent attention by an operator.

Moreover, the presence of the reaction products arising at the reference electrode prevents the solution passed through the metering cell from being reused as the electrolyte in the next metering processes. During the recirculation of used electrolyte the concentration of the reaction products would grow according to an exponential time function, whereby the permanent continuous metering process would become impossible.

The purpose of the present invention and the basic object of the same is to overcome the aforementioned disadvantages and significantly to improve the method of and apparatus for continuous electrochemical metering of substance concentrations in gaseous media, with electrolyte recirculation.

SUMMARY OF THE INVENTION

A method of continuous electrochemical metering of concentrations of or analyzing some noxious substances, such as sulphur dioxide, hydrogen sulphide, halogens, or ozone, in gaseous media, comprises the steps of drawing an electrolyte solution from a storage tank; forcing said solution successively through a metering system of electrode cells with at least one indicating electrode, a reference electrode cell forming the last downstream stage of said system whereby harmful products arising in electrode reactions are made ineffective by electrochemical reactions, the concentration grade of said products being proportional to the sum of currents flowing through said metering system; reintroducing a major portion (at least 90%) of said electrolyte solution back into the storage tank to be repeatedly recirculated; and passing a minor portion (at most 10%) of said electrolyte solution through said reference electrode cell.

The said electrolyte solution is an aqueous solution of sulphuric acid which is saturated with elemental iodine during its passage between the storage tank and the metering system.

The harmful electrochemically active substances arising in the electrolyte solution during the recirculation thereof are rendered ineffective by an electrochemical reaction in at least one of the electrode cells disposed upstream of the electrode cell fed with the gaseous medium to be analyzed, the reaction taking place at least at one electrode (except the reference electrode) to which there is applied the same voltage as or one differing by 0.1 v., from that applied to the indicator electrode.

The harmful products of the electrode reaction which have penetrated from the reference electrode cell in the counterflow direction of the electrolyte solution are rendered ineffective by an electrochemical reaction in the electrode cell from which the recirculated electrolyte solution is withdrawn, the last mentioned reaction taking place at an electrode to which there is applied, except the reference electrode, the same voltage as or one differing by 0.1 v. from that applied to the indicator electrode.

The apparatus of the invention is for the continuous electrochemical metering of concentration of or for analyzing some noxious substances, such as sulphur dioxide, hydrogen sulphide, halogens, or ozone, in gaseous media, in which a recirculation of an electrolyte solution is employed, such apparatus comprises in combination, a storage tank for the electrolyte solution; a metering system including at least three electrode cells, each receiving an electrode, which cells are adapted to communicate with each other via diaphragms and ducts to allow both the gaseous medium and the electrolyte solution to flow therethrough, the system including at least one indicator electrode, and one reference electrode received in the last downstream cell of the system; a pump designed for controlling the flow of the electrolyte solution from the storage tank into the metering system; and another pump designed for controlling the flow of the electrolyte solution through the reference electrode cell, the rate of discharge of the pump for controlling the flow of the electrolyte solution from the storage tank into the metering system is at least ten times higher than that of the pump for controlling the flow of the electrolyte solution through the reference cell.

The said apparatus, wherein the metering system, apart from the at least one indicator electrode which is interconnected with a metering device for indicating the concentration of the substance to be examined, includes at least two electrodes which are not interconnected with said concentration indicating device; at least one of said last two electrodes is disposed upstream of the indicator electrode while the other is disposed downstream of the same.

In said apparatus, the last but one downstream electrode cell is made to communicate with the last or reference electrode cell of said metering system via a duct of which the inner diameter is enlarged at least within one region thereof and provided with diaphragms designed to insure a sufficient electrolytic conductivity between the reference electrode and the other electrodes.

DESCRIPTION OF THE PREFERRED EMBODIMENTS

Figure 1:
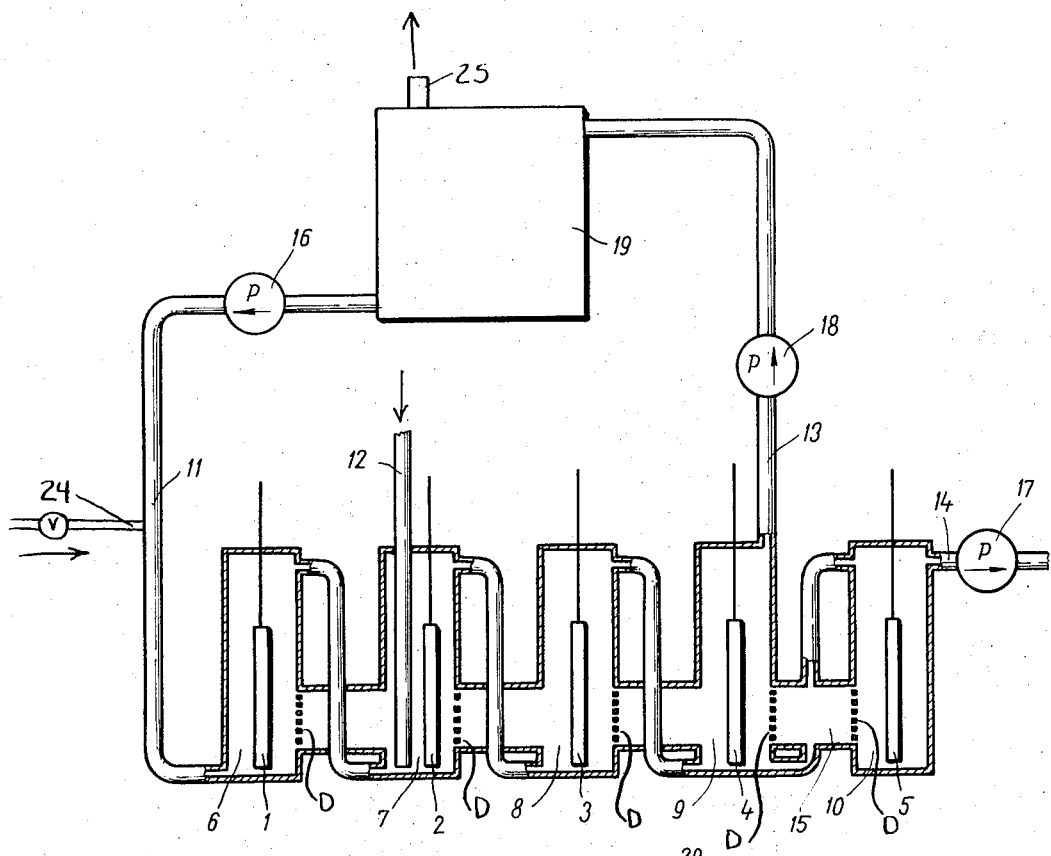
FIG. 1 is a somewhat schematic vertical sectional view of an apparatus for the continuous electrochemical metering of the concentrations of substances in gaseous media by a method employing electrolyte recirculation.

Discussing now the drawing in detail, and first FIG. 1 therof, it will be seen that reference symbol 19 identifies a storage tank for an electrolyte solution which is slowly supplied at a rate of at least 0.01 milliliter/min. therefrom into a metering cell comprising five electrodes 1, 2, 3, 4 and 5 which are housed in respective compartments 6, 7, 8, 9, 10 communicating with each other via diaphragms D indicated in dotted lines, the last-named electrode 5 in the compartment 10 being the reference electrode. The electrolyte solution flows successively through the electrode compartments 6 to 9 incl., a predominant portion (at least 90 percent) being reintroduced into the storage tank 19, by pipe 13 and pump 18, from which it is repeatedly recirculated. A minor portion (less than 10 percent) of the electrolyte is withdrawn from the compartment 10 of the reference electrode 5 through pipe 14 and pump 17 to a waste receptacle (not shown), carrying along with it the detrimental products of the electrode reaction.

To the electrodes 1–4, incl., there is applied a constant D.C. voltage of such a magnitude as to provide the desired electrochemical reaction, the first electrode 1 housed in the compartment 6 and protected from any contact with the gaseous medium to be analyzed is designed to "paralyze," that is, as completely as possible electrochemically to oxidize or reduce the harmful electrochemically active substances arising in the solution during its passage through the recirculating system including the storage tank 19 and pumps 16 and 18. The indicator electrode 2 is housed in the compartment 7 into which the gaseous medium to be analyzed is supplied through a pipe 12. In this compartment an absorption of the respective substances takes place, accompanied possibly by a chemical reaction, and at the surface of the indicator electrode 2 there is provoked an electrochemical reaction, the throughflowing electrolytic current determining the degree of concentration of the substance to be examined.

The electrode 4 in the compartment 9 is designed to "paralyze," i.e. electrochemically oxidize or reduce, that the harmful electrochemically active substances from penetrate, with a very slow throughflow adjacent the reference electrode in view, from the reference electrode in the counterflow direction (right to left in FIG. 1) of the solution. The actions of the electrodes 1 and 4 prevents the harmful electrochemically active substances rom penetrating into the compartment 7 containing the indicating electrode 2, and to render the so-called residual current within the circuit of the indicator electrode negligibly small. In the event that during the recirculation of the solution only an unconsiderable contamination thereof with the harmful electrochemically active substances occurs, one of the aforesaid electrodes 1 and 4 can be omitted.

To the particular electrodes, except the reference electrode 5, it is possible to apply voltages varying by 0.1 v. at the most as to insure the optimum potential corresponding to the electrochemical reactions on the respective electrodes. Nevertheless the electrochemical reactions taking place at the respective electrodes require approximately the same potentials.

Figure 2:
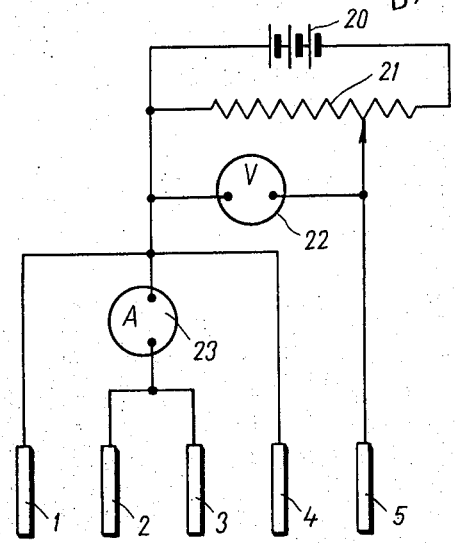
FIG. 2 is a wiring diagram for the apparatus illustrated in FIG. 1.

Therefore it is preferable to apply to all the electrodes, except the reference electrode 5, the same voltage, it being possible to use a single common power source, such as, for instance a battery 20 equipped with a potentiometer 21 (see FIG. 2).

In case the electrochemical reaction does not take place completely at some of the electrodes, except the reference electrode 5, as is desired in coulometric processes, it may be advisable to use a metering cell having a plurality of electrodes disposed in additional electrode compartments communicating with one another via diaphragms. It is to be understood that such an arrangement is of importance particularly if indicator electrodes are concerned. By using more than one indicator electrode, namely, it is possible to obtain the maximum current output, since that portion of the substances which has not reacted on the first indicator electrode will not fail to react on the second indicator electrode, or on the third etc., as referred to in my prior Czechoslovak Pat. No. 132,672.

In wiring diagram of FIG. 2 two indicator electrodes 2 and 3 connected in parallel are used. By means of a current metering device 23, such as, for example, a recording ammeter, there is recorded, as a rate of the concentration of the substance to be examined, the sum of the electrolytic current flowing through the two indicator electrodes. The currents flowing through the electrodes 1 and 4 need not be recorded during the normal metering process.

An essential part of the apparatus for carrying out the method according to the present invention is constituted by a metering electrolytic cell made of glass or a chemically inert plastic, such as, for instance, "Lucite" (acrylic resin sold by Du Pont), and comprising at least three electrodes of carbon or a noble metal, which are housed in the particular compartments communicating with each other via diaphragms and ducts both the gaseous medium and the solution to flow therethrough, as schematically shown in FIG. 1. As above indicated, the pump 16, which feed the electrolyte solution from the storage tank 19 into the metering cell has an output rate which is at least ten times higher than that of pump 17, which serves for controlling the flow of the solution through the compartment 10 of the reference electrode 5 and therefrom into the waste receptacle (not shown).

In order to reduce the danger of return of the harmful products of the electrode reaction from the reference electrode 5 back to the indicator electrode or electrodes to minimum, it is necessary to make the path which the solution is to cover on its way to the reference electrode as long as possible. This is why the metering cell (or actually its last but one downstream electrode compartment 9 containing the recirculated electrolyte), is made to communicate, preferably, with the compartment 10 of the reference electrode 5 via a relatively narrow and long duct having a diameter of from 1 to 4 millimeters and length of from 3 to 20 centimeters, of which at least one region is enlarged as at 15, the region comprising diaphragms to insure a sufficient electrolyte conductivity between the reference electrode and the other ones.

By using the method and apparatus according to the present invention it is possible to carry out long-termed continuous electrochemical measurements of concentrations of various both chemically and electrochemically active substances, such as sulphur dioxide, hydrogen sulphide, halogens, or ozone, in gaseous media.

The following example of a method of and an apparatus for measuring trace concentrations of sulphur dioxide, which will now be described is not intended to limit the scope of the present invention in any way.

Into a metering electrolytic cell with five electrode compartments 6 to 10 (see FIG. 1) communicating with each other via diaphragms, there is supplied from a storage tank 19 by a pump 16 at a rate of about 0.05 milliliter/min. of about a one percent aqueous sulphuric acid solution which on its way is saturated with elemental iodine contained in a pipe 24 disposed between the pump 16 and the metering cell. The solution flows through the electrode compartments 6 to 9, incl., and a predominant portion thereof is taken off via a pipe 13 together with the air entering the metering cell via the tube 12 in the second downstream electrode compartment 7. Both the solution and air are withdrawn by a pump 18 at a rate of about 200 milliliters/min. back into the storage tank 19 from which the air escapes through pipe 25 connected to the top wall thereof while the solution is subject to a permanent recirculation, i.e. reintroduced by the pump 16 into the metering cell. From the bottom part of the electrode compartment 9 a small portion of the solution, i.e. from about 0.5 to one milliliter per day, is withdrawn through a duct with an enlarged region 15 between diaphragms over electrode compartment 10 via pipe 14 and the pump 17 into a waste receptacle.

To the electrodes 1 to 4, incl., which are preferably made from carbon or a noble metal, such as platinum, there is applied, a constant D.C. voltage of about plus 0.25 v. from a power source 20 (see FIG. 2) via a potentiometer 21, which voltage is controlled by a voltmeter 22.

At the electrode 1 there occurs practically the complete electrolysis, i.e. anodic oxidation, of all the substances, particularly iodide ions, which may arise in the solution during the recirculation thereof and which, if not removed, would undesirably participate in the electrode reaction at the indicator electrode. In the electrode compartment 7 sulphur dioxide from the supplied air reacts chemically with iodine from the solution supplied through pipe 24, giving rise to an equivalent amount of iodide ions which will then be converted by anodic oxidation at indicator electrode 2 back to iodine.

At the second indicator electrode 3 both chemical and electrochemical reaction is completed in that the portion of sulphur dioxide and iodide ions which has failed to react at the preceding electrode 2, will react at least thereon. At the next electrode 4 there are subject to anodic oxidation those traces of iodide ions which may have penetrated in the counterflow direction of the solution from the reference electrode 5. The reference electrode 5 (cathode) is maintained at a practically constant potential by the presence of iodine which is gradually reduced thereon to iodide ions, which latter are slowly carried along with the flowing solution via the pump 17 to a waste receptacle. The electrode compartment 10 is enlarged at one of its sides (not shown in FIG. 1), which enlargement is designed for storing a sufficient amount of iodine acting as a depolarizer for the reference electrode 5.

The sum of electrolytic currents flowing through the indicating electrodes 2 and 3 as a measure corresponding to the degree of concentration of sulphur dioxide in the throughflowing air, is metered and recorded by a current meter 23, such as, for instance a recording microammeter.

The metering cell system consists of a kit of particular cells or compartments made of a chemically inert plastic, such as "Lucite," the individual cells communicating via semipermeable diaphragms mounted in appropriate gaskets.

For pumping the electrolytic solution there are preferably used peristaltic pumps 16 and 17 driven by small-output electric motors via gear boxes. The pumping of the air is carried out by a diaphragm pump 18 made from a plastic capable of withstanding the presence of aggressive chemicals, i.e. sulphuric acid and iodine.

The amount of tending the apparatus according to the present invention is limited to a periodical exchange of the one percent sulphuric acid solution in the storage tank 19 (usually every three to six months), without its being necessary to stop the measuring process, and further to the removal of the solution withdrawn through the reference electrode compartment, usually at the same time intervals, and to the restoration of the iodine store, say, once a year. Through the compartment of the indicator electrode 3 at least ten times lower electrolytic current must flow than through the compartment of the first indicator electrode 2, which condition confirms the correct quantitative, i.e. coulometering, course of both the chemical and electrochemical reaction; this is ascertainable by switching off the circuit of the first indicating electrode.

The apparatus need not be calibrated. The apparatus is easily portable and can be used even on trucks for use in the field rather than being confined to use in a laboratory.

According to the Faraday's laws, the electrolytic current corresponding to the concentration of one milligram $SO_2$/cu. meter, with a gas flow of 200 milliliters/min., amounts to 10 $\mu$a. Optimum concentration values measurable by the apparatus of the invention vary between 0.01 to 2 milligrams $SO_2$/cu. meter.

Water losses occuring during the flow of the gaseous medium through the metering system need not be compensated, provided the rate of gas flow is not too high, since the changes in concentration of the electrolyte, due to water evaporation within the time intervals between the respective electrolyte exchanges, i.e. of from three to six months, as a rule do not significantly affect the current magnitude which furnishes a measure of the degree of concentration of the substance to be examined.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A method of continuous electrochemical metering concentrations of substance in gaseous media, comprising the steps of
   (a) drawing an electrolyte solution from a storage tank;
   (b) introducing gaseous media with measured substance in said electrolyte solution;
   (c) forcing said solution successively through at least one purifying electrode cell with at least one electrode, where the harmful electrochemically active substances are made ineffective by electrochemical reaction;
   (d) forcing said electrolyte solution sucessively through a metering system comprising at least one metering electrode cell with at least one indicating electrode;
   (e) forcing said electrolyte solution successively through at least one screening electrode cell with at least one electrode to which there is applied substantially the same voltage as that applied to the electrode of said purifying electrode cell and to said indicating electrode, where the harmful electrochemically active substances, which have penetrated in counterflow direction are made ineffective by an electrochemical reaction;

(f) reintroducing a predominant portion of said electrolyte solution back into the storage tank to be repeatedly recirculated;

(g) passing a minor portion of said electrolyte solution through a reference electrode cell with a reference electrode; and (h) measuring the electrical current flowing in a circuit comprising the indicating electrodes of said metering system, said reference electrode, a power supply unit, and a current metering device.

2. A method as defined in claim 1, wherein said substance in gaseous media is sulfur dioxide, the electrolyte solution is an aqueous solution of sulphuric acid, and comprising saturating the electrolyte with elemental iodine during its passage between the storage tank and the metering system.

3. A method as defined in claim 1, wherein the predominant portion of said electrolyte solution is at least 90 percent thereof, and wherein the minor portion of said electrolyte solution is at most 10 percent thereof.

4. An apparatus for continuous electrochemical metering of a concentration of substances in gaseous media, in which a recirculation of an electrolyte solution is employed, comprising in combination:

(a) a storage tank for the electrolyte solution;

(b) at least one purifying electrode cell having at least one electrode and an input and an output, the input of which is connnected by duct to said storage tank and where the harmful electrochemically active substances contained eventually in the electrolyte solution are made ineffective by an electrochemical reaction;

(c) a metering system with an input and an output comprising at least one metering electrode cell, whose input is connected by duct to output of said purifying electrode cell, the metering electrode cell containing at least one indicating electrode;

(d) an intake for the gaseous media with substances the concentration of which is measured into said metering system;

(e) at least one screening electrode cell with input and two outputs having at least one electrode, the input of which is connnected by a duct to the output of said metering system and wherein the first output is connected to the storage tank;

(f) a duct between the output of said screening electrode cell and said storage tank;

(g) a reference electrode cell with an input and an output having at least one reference electrode, which input is connected to the second output of said screening electrode cell via a porous diaphragn;

(h) diaphragms between each of the cells, said diaphragms enabling a passage of electrical current through the diaphragms and preventing a passage of such an amount of electrolyte which could adversary effect the accuracy and sensitivity of the measuring; and (i) a metering electrical circuit comprising a power supply unit and a current metering device said metering electrical circuit connected on the one hand to said indicating electrode, and on the other hand to said reference electrode.

5. An apparatus as defined in claim 4, wherein in the duct between said storage tank and said purifying electrode cell is interposed a pump, and in the duct between said screening electrode cell and said storage tank there is interposed another pump.

References Cited
FOREIGN PATENTS
1,181,578   2/1970   Great Britain _____ 204—1 T GERALD L. KAPLAN, Primary Examiner U.S. Cl. X.R.

204—195 R, 257, 258